J. B. KUNKEL.
HINGE.
APPLICATION FILED APR. 20, 1921.

1,402,871. Patented Jan. 10, 1922.

Inventor
John B. Kunkel

Attorneys

UNITED STATES PATENT OFFICE.

JOHN B. KUNKEL, OF DETROIT, MICHIGAN.

HINGE.

1,402,871.　　　　Specification of Letters Patent.　　Patented Jan. 10, 1922.

Application filed April 20, 1921. Serial No. 462,899.

*To all whom it may concern:*

Be it known that I, JOHN B. KUNKEL, a citizen of the United States of America, residing at Detroit, in the county of Wayne and State of Michigan, have invented certain new and useful Improvements in Hinges, of which the following is a specification, reference being had therein to the accompanying drawings.

The invention relates to hinges and more particularly to the concealed door type adapted particularly for use upon automobiles. One object of the invention is the provision of a hinge in which the cover inclosing one hinge member is reinforced; and in which this reinforcement is engaged by the means for securing the hinged member to the cover, and further limits the relative rotation of the hinge members in one direction. Other objects of the invention reside in the novel features of construction and combinations and arrangements of parts as more fully hereinafter set forth.

Figure 1:
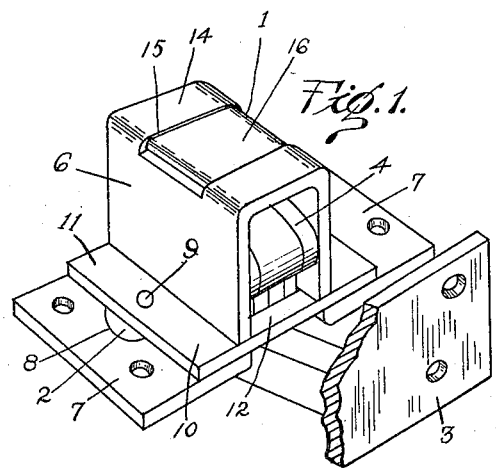
Figure 1 is a perspective view of a hinge embodying my invention.
Figure 2:
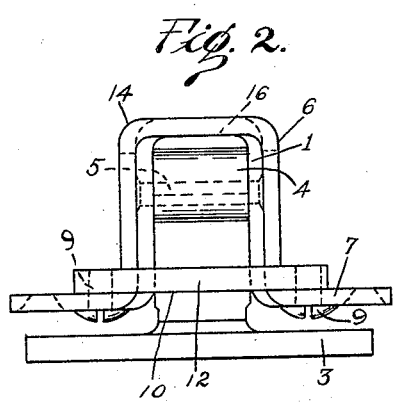
Figure 2 is an end elevation thereof.
Figure 3:
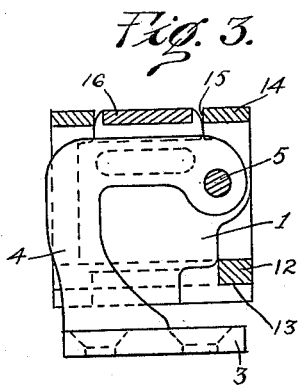
Figure 3 is a cross section therethrough.
Figure 4:
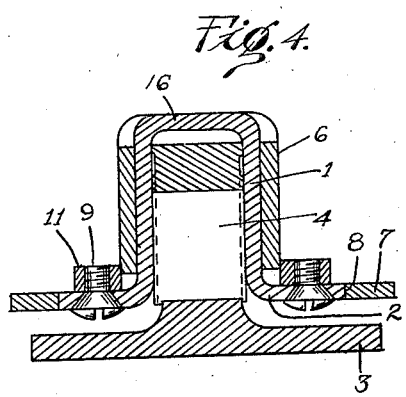
Figure 4 is a cross section therethrough taken at right angles to Figure 3.

1 is the U-shaped body and 2 the laterally extending foot flanges of the hinge member adapted to be secured in a stationary support such as the body of the motor vehicle. 3 is the base and 4 the goose neck of the co-operating hinge member adapted to be secured to the swinging door of the vehicle. The goose neck 4 extends between the sides of the U-shaped body 1 and is secured thereto at its free end by the pivot 5. The hinge cover has the U-shaped body 6 and the laterally extending foot flanges 7 with the apertures 8 therein, whereby when the U-shaped body 1 of the stationary hinge member lies within the U-shaped body 6 of the cover, the foot flanges 2 engage in the apertures of the foot flanges 7.

For the purpose of reinforcing the hinge cover, and at the same time affording a support for engagement by the means 9, such as screws, for detachably securing the stationary hinge member to the hinge cover, there is the U-shaped member 10 having its arms 11 at opposite sides of the U-shaped body 6 of the cover and upon the foot flanges 7 thereof, the cross bar 12 between the ends of these arms engaging in slots 13 in the sides of the U-shaped body of the cover. This U-shaped member is rigidly secured to the hinge cover as by spot-welding the same, and has suitable threaded apertures for the securing means 9 passing through the foot flanges 2 of the stationary hinge member. Furthermore, with this construction the cross bar 12 of the U-shaped member forms a stop for limiting the relative rotation of the hinge members in one direction due to the fact that the goose neck 4 of the swinging hinge member comes into contact therewith.

Another important feature is that the U-shaped member 10 maintains an accurate width of opening in the hinge cover for receiving the stationary hinge member so that the latter may be removed or replaced without binding or distortion. Moreover, this U-shaped member provides a strengthening means to compensate for the cut in the body filler which is made necessary in the application of the hinge to an automobile body. That is the U-shaped member holding the sides of the U-shaped body of the cover in predetermined relation to each other resist any stresses incident to the weaving of the door and automobile body.

In order to permit of the use of a cheaper metal for forming the stationary hinge member and at the same time to position its U-shaped body 1 within the cover, the top 14 of the U-shaped body 6 of the cover has the aperture 15 therethrough and the top 16 of the U-shaped body 1 of the stationary hinge member is punched outwardly to engage in this aperture. With this arrangement, the metal forming the hinge member 1 is all bent in one direction instead of in transverse directions so that the use of a cheaper material which can be readily stamped out is allowed. This is essential since a certain grade of metal is required if the same is to successfully withstand bending transverse to as well as with the grain; whereas if all the bending is with the grain a lower grade of and cheaper metal may be used.

What I claim as my invention is:

1. In a hinge, the combination with a cover having a U-shaped body and laterally extending foot flanges, of a hinge member having a U-shaped body and laterally extending flanges, said hinge member engaging within said cover, and a re-inforcing member secured to said cover and having portions adjacent to its foot flanges and at opposite sides of its U-shaped body, and securing means passing through the flanges of said hinge member and engaging in said reinforcement for securing said hinge member to said cover.

2. In a hinge, the combination with a cover having a U-shaped body and laterally extending foot flanges, of a hinge member having a U-shaped body engaging within said first-mentioned U-shaped cover and laterally extending foot flanges engaging in said first-mentioned foot flanges, a second hinge member pivotally connected to said first-mentioned hinge member within said cover, and a reinforcing member rigidly secured to said cover and having portions extending adjacent to its foot flanges and at the opposite sides of its U-shaped body and a cross bar between the ends of said portions, said reinforcing member constituting a reinforcment for said cover, and a stop for limiting the relative rotation of said hinge members in one direction.

3. In a hinge, the combination with a cover having a U-shaped body with an aperture in its top, of a hinge member formed of a stamping having a U-shaped body and laterally extending foot flanges, the body of said hinge member having its top partially struck out to engage in the aperture in the top of said first-mentioned body.

4. In a hinge, the combination with a cover having a U-shaped body and laterally extending foot flanges, of a hinge member having a U-shaped body engaging within said first-mentioned U-shaped cover and laterally extending foot flanges, and a reinforcing member rigidly secured to said cover and having portions extending adjacent to its foot flanges and at the opposite sides of its U-shaped body, and a cross bar between the ends of said portions, said reinforcing member constituting a reinforcement for said cover a means of maintaining an accurate width between the opposite sides of the U-shaped body of said cover, and strengthening means for compensating for the cut in the body filler.

5. In a hinge, the combination with a cover having an apertured U-shaped body and laterally extending foot flanges, of a hinge member having a U-shaped body and laterally extending foot flanges adapted to fit within said cover and extend into said aperture, and means engaging the foot flanges of said hinge for securing said cover and hinge to each other.

In testimony whereof I affix my signature.

JOHN B. KUNKEL.